US 6,636,701 B1

(12) United States Patent
Vezard et al.

(10) Patent No.: US 6,636,701 B1
(45) Date of Patent: *Oct. 21, 2003

(54) ULTRAVIOLET IMAGER SYSTEM AND METHOD

(75) Inventors: Nicolas Vezard, Heusse (FR); Gregoire Verrier, Metz (FR)

(73) Assignee: Jobin Yvon, Inc., Edison, NJ (US)

( * ) Notice: Subject to any disclaimer, the term of this patent is extended or adjusted under 35 U.S.C. 154(b) by 118 days.

This patent is subject to a terminal disclaimer.

(21) Appl. No.: 09/823,297

(22) Filed: Mar. 30, 2001

Related U.S. Application Data

(63) Continuation-in-part of application No. 09/328,811, filed on Jun. 9, 1999, now Pat. No. 6,392,238.

(51) Int. Cl.[7] .................. G03B 13/02; G03B 17/48; G03B 19/00; G01J 1/42
(52) U.S. Cl. .................. 396/374; 396/429; 250/372
(58) Field of Search .................. 396/429, 432, 396/374; 359/350, 351, 353; 250/372

(56) References Cited

U.S. PATENT DOCUMENTS

| | | | |
|---|---|---|---|
| 4,047,206 A | 9/1977 | Kitagami et al. | 396/358 |
| 4,530,736 A | 7/1985 | Mutter | 156/643 |
| 4,714,962 A | * 12/1987 | Levine | 396/429 |
| 4,872,030 A | * 10/1989 | Kochmann et al. | 396/429 |
| 4,983,846 A | 1/1991 | Rios et al. | 250/458.1 |
| 5,149,972 A | 9/1992 | Fay et al. | 250/461.1 |
| 5,481,401 A | * 1/1996 | Kita et al. | 359/353 |
| 5,485,530 A | 1/1996 | Lakowicz et al. | 382/191 |
| 5,581,356 A | 12/1996 | Vezard | 356/418 |
| 5,932,886 A | 8/1999 | Arai et al. | 250/504 R |
| 6,009,340 A | 12/1999 | Hsia | 600/407 |

FOREIGN PATENT DOCUMENTS

WO   WO 75639 A1   12/2000   .......... G01N/21/23

OTHER PUBLICATIONS

Eliadis, E., Article: UV Photography [online] Nov. 1997 [retrieved on Aug. 29, 2000]. Retrieved from the Internet: URL http://users.hol.gr/~eliad/uvtheo.htm.
KSS1001 Basic Direct View KRIMESITE™ SCOPE [online] Sirchie Fingerprint Laboratories, Inc., 1999 [retrieved on Aug. 29, 2000]. Retrieved from the Internet: URL http://www.ruvis.com/basic.htm.
Scenescope [online] Instruments S.A., Inc. 1998 [retrieved on Aug. 29, 2000]. Retrieved from the Internet: URL http://www.crimescope.com/Scene/scenesco.htm.
The Full Fingerprint Solution [online] Instruments S.A., Inc. 1998 [retrieved on Aug. 29, 2000]. Retrieved from the Internet: URL http://www.crimescope.com/JYHads2–FINALFINAL–RnB.pd.
Nightline, Inc. Night Vision Devices [online] Retrieved from the Internet: URL http://www.nightline–inc.com.

* cited by examiner

*Primary Examiner*—Christopher Mahoney
(74) *Attorney, Agent, or Firm*—Handal & Morofsky

(57) ABSTRACT

An ultraviolet imager for forensic and other purpose, e.g. for detection of fingerprints and other forensic evidence at crime scenes permits live simultaneous viewing, with live focusing adjustments, of an ultraviolet image, converted to visible light, and capture of the ultraviolet image on light sensitive film. A modified SLR camera provides film image capture and is optically coupled with a light intensifier for viewing and focusing. A preferred viewing system employs optical symmetry between the camera and the intensfier. Both the camera and the viewing system are optimized for processing ultraviolet light by employing ultraviolet transmissive lens elements and ultraviolet-reflective mirrors throughout.

27 Claims, 7 Drawing Sheets

View A        View B        View C

ULTRAVIOLET IMAGER SYSTEM AND METHOD

CROSS-REFERENCE TO A RELATED APPLICATION

This application is a continuation-in-part of commonly owned U.S. patent application Ser. No. 09/328,811, of Nicholas Vezard filed Jun. 9, 1999 now U.S. Pat. No. 6,392,238, the disclosure of which is hereby incorporated herein by reference thereto.

STATEMENT REGARDING FEDERALLY SPONSORED RESEARCH OR DEVELOPMENT (Not applicable.)

FIELD OF THE INVENTION

The present invention relates to an ultraviolet imager system or method, useful inter alia, for the detection of fingerprints and other forensic evidence at crime scenes, on evidentiary objects or materials, or elsewhere. The invention provides a novel system for detecting images by ultraviolet light ("UV" hereinafter) and capturing the images on film or electronic media. More particularly, the present invention provides a novel ultraviolet light-imager system that permits simultaneous photographing and viewing of fingerprints and other evidence.

BACKGROUND OF THE INVENTION

Special tools are frequently used by law enforcement personnel when evaluating a crime scene to collect forensic evidence that is invisible to the human eye. Examples of such evidence include bodily fluids, fingerprints on porous and non-porous surfaces, forged documents, explosives residue and trace evidence e.g., hair, fibers, etc. One commonly used tool is a forensic light source that provides fluorescent light to detect and record forensic evidence.

A recently introduced complementary tool to the forensic light source is a tool that relies on intensified short-wave ultraviolet reflectance as opposed to ultraviolet-induced fluorescence. Such an ultraviolet light tool can reveal additional evidence on non-porous surfaces where other forensic light sources are not useable or the subject requires processing with powders or fluorescent dyes.

Conventional forensic tools that utilize ultraviolet light reflectance from an ultraviolet light source, enable a traditional photograph to be taken at the output of an intensifier tube. However, the resolution of such photographs is poor, being limited by the resolution of the intensifier in line pairs/mm.

One ultraviolet light tool that does not rely on the output of an intensifier to obtain a photograph is a "SCENE-SCOPE" (trademark) ultraviolet imager, available from applicant's assignee, Jobin Yvon, Inc., which is a system that employs a modified single lens reflex camera, notably, a Nikon (trademark, Nikon Corp.) FM2 camera The "SCE-NESCOPE" (trademark) imager utilizes an intensifier coupled to the viewing output of a modified 35 mm camera to provide both non-intensified photography of ultraviolet light reflectance from fingerprints on various backgrounds, and simultaneous intensified image focusing and viewing.

The intensifier operates electronically to increase the luminescence of the image and provide a visible wavelength output for example on a video screen. The intensifier is used to help focus the camera when using an invisible light source such as ultraviolet light (200–400 nm) or infrared (above 700 nm). Direct focusing is not feasible since ultraviolet light or infrared images are not visible to, and may be harmful to, the naked eye. A problem with the "SCENE-SCOPE" (trademark), is that an inferior quality image may be obtained at the intensifier which, pursuant to the present invention, can be attributed to the low intensity of the ultraviolet light image which is received by the intensifier.

There is accordingly a need for an improved ultraviolet light imager which can overcome this problem.

BRIEF SUMMARY OF THE INVENTION

The present invention solves the problem of poor focus image quality in an ultraviolet imager of the type employing an intensifier coupled to the viewing output of a camera. To solve this problem, the invention provides an ultraviolet light imager comprising:

a) a camera having:
   i) a focusable camera lens to input ultraviolet light images to the camera;
   ii) a film holder for a light-sensitive film to capture images received from the camera lens, the spacing of the camera lens from the film being adjustable to focus an ultraviolet image on the film; and
   iii) a camera mirror having an ultraviolet-reflective surface to reflect a portion of the image light received from the camera lens to provide a reflected ultraviolet image for use in focusing the camera lens; and b) an image intensifier optically coupled to the camera to receive the reflected ultraviolet image from the camera mirror and provide a viewable output; wherein the reflected ultraviolet image is focused to the viewable output of the intensifier.

Preferably, the camera lens includes a first ultraviolet coated mirror and a quartz or fused silica ultraviolet-transmissive camera lens. The ultraviolet-imager system can also include a second ultraviolet coated mirror coupled to the camera through a lens system, the image intensifier being optically coupled to the second ultraviolet reflectively coated mirror to receive images therefrom.

BRIEF DESCRIPTION OF THE SEVERAL VIEWS OF THE DRAWING

Some embodiments of the invention, and of making and using the invention, as well as the best mode contemplated of carrying out the invention, are described in detail below, by way of example, with reference to the accompanying drawings, in which like reference characters designate like elements throughout the several views, and in which:

FIG. 3A is a plan view of a portion of the ultraviolet imager shown in FIG. 3;

DETAILED DESCRIPTION OF THE INVENTION

Figure 1:
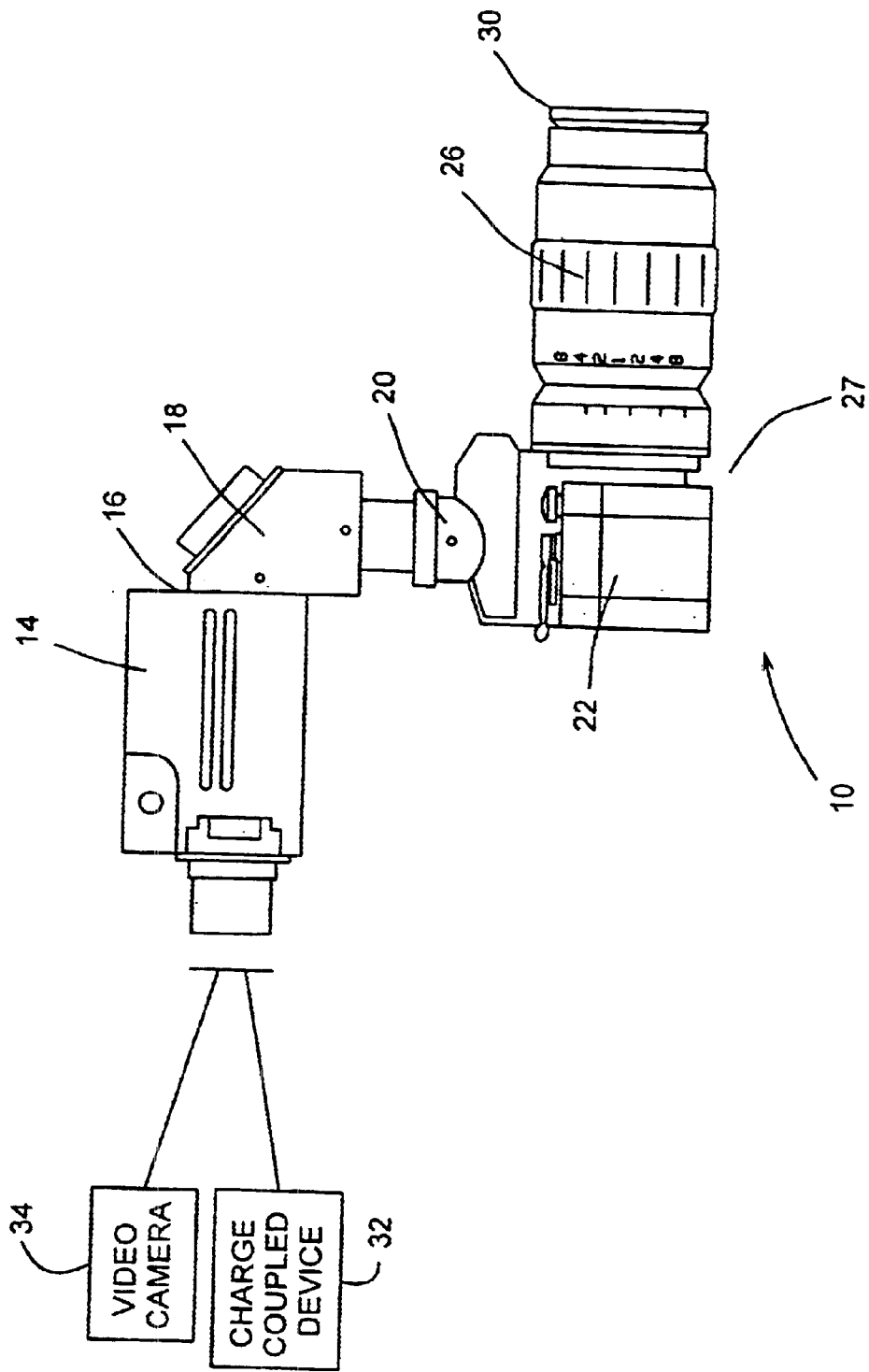
FIG. 1 is a side elevation view of a ultraviolet-imager system in accordance with one embodiment of the present invention.

One preferred embodiment of the present invention comprises an ultraviolet light imager system that includes ultraviolet-reflective mirrors coated to increase the intensity of internally reflected ultraviolet light.

Referring to the drawings, an ultraviolet imager system 10 includes a single lens reflex camera 24 which can be a modified conventional camera, for example a modified model FM2 camera from Nikon Corp. which employs light-sensitive film to capture optical images.

To provide camera 24, a conventional Nikon FM2 camera is modified by removing the factory-provided mirror and replacing it with an ultraviolet-reflecting, coated mirror 22. The ultraviolet reflection coating of mirror 24 reflects light having a wavelength within the range of approximately 200 to 360 nm. In a preferred embodiment, the coating of mirror 22 has a peak reflectance at approximately 254 nm, and reflects 90–95% of light at all ultraviolet wavelengths compared to about 20–25% ultraviolet reflectivity for a conventional camera mirror.

Camera 24 further includes a dual lens system 28 that replaces the prism found in a conventional camera. In one embodiment, the dual lens system includes two lenses, each of which is a silica lens with a focal length of 50 mm and diameter of 22.5 mm. An additional modification, is that the stock focusing screen included with the conventional camera is removed from camera 24. In use, camera 24 is loaded with an ultraviolet-light-sensitive film, for example is KODAK (trademark) Tri-X 400 ASA or other suitable speed.

Camera 24 includes an ultraviolet-light-transmissive camera lens 26. Camera lens 26 can be any known manual or motorized lens or zoom lens that is made of ultraviolet-light-transmissive material. In one embodiment, camera lens 26 is a modified 105 mm NIKON (trademark) quartz lens. Coupled to lens 26 is a 254 nm filter 30. In an alternative embodiment, particularly suitable for outdoor use, two stacked 254 nm filters 30 are coupled to lens 26. Camera 24 is thus optimized for ultraviolet photography at a wavelength of about 254 nm, which is the wavelength of one preferred source of illumination.

Camera 24 is coupled to a holder 18 for a second mirror (not shown) by a lockable mechanism 20 which allows positional adjustment of second mirror holder 18 relative to camera 24. The second mirror is supported within holder 18 and also has an ultraviolet-light-reflective coating reflecting wavelengths within a range of approximately 200–360 nm.

Second mirror holder 18 is coupled to an intensifier 14 through a flush contact 16. Intensifier 14 intensifies light received from second mirror holder 18 so that the light image can be directly viewed or sent to a charge-coupled device ("CCD"). Intensifier 14 can be a first, second, or third generation intensifier, or merely an ultraviolet-to-green-light converter.

An eyepiece 12 is coupled to intensifier 14 for direct human viewing. Optionally, a CCD digital camera 32, a video camera 34 or other electronic image capture device can be coupled to eyepiece 12 to provide a digital image record, video monitor viewing and focusing or videotaping while the objects are photographed by ultraviolet light.

In use, ultraviolet-imager system 10 allows fingerprints or other forensic objects to be photographed by camera 24, and, if desired, to be simultaneously viewed through eyepiece 12 for composition and focusing. The ultraviolet-light-reflective coating on camera mirror 22 and the second mirror of imager system 10 boost the ultraviolet reflectance which enhancing the image of the objects. The absence of the stock focusing screen and prism from camera 24 avoids ultraviolet transmission losses in the light path to intensifier 14 which would result from ultraviolet absorbence by these conventional optical components. Pursuant to the invention, image intensities at the film, and the intensifier, are optimized by employment throughout the light path of light processing materials which are selected for low absorbency of ultraviolet light, i.e. by use of ultraviolet-light transmissive lenses and ultraviolet-light reflective mirrors. Further enhancements are attributable to the additional use of a filter, or filters, 30 and a light source both optimized to a low-absorbent ultraviolet wavelength, such as 254 nm, as described hereinabove.

Dual lens system 28 between mirror 24 and second mirror holder 18 re-images the objects as a flat field onto the front face of intensifier 14.

Several embodiments of the present invention are specifically illustrated and/or described herein. However, it will be appreciated that modifications and variations of the present invention are covered by the above teachings and are within the purview of the appended claims without departing from the spirit and intended scope of the invention.

In an alternative embodiment to that shown in FIG. 1, the intensifier is separate from the camera. However, provided the camera body is large enough, the intensifier can be installed inside the camera body. This can reduce the number of optics and increases the image quality at the output of the intensifier.

While the ultraviolet imager shown in FIG. 1 is useful and effective for many purposes, in some cases it would be desirable to provide an ultraviolet imager which can generate at the intensifier output an image which is substantially flattened to have a large area in focus, when the camera lens is focused.

It would also be desirable to provide an ultraviolet imager employing an electronic imaging device mounted to a single lens reflex camera, which imager has a factory pre-set, fixed focus between the camera body and the intensifier, that does not require additional adjustments in the field to provide a viewing system that may be reliably focused on a desired target by adjustments of the camera lens.

Furthermore, it would be desirable to provide an ultraviolet imager which displayed an image comprising a large proportion of the camera's field of view and which occupies a substantial portion of the intensifier's display. A suitable commercially available intensifier has a circular input, which may for example be 18 mm in diameter, and it is accordingly difficult effectively to fit the standard rectangular 35 mm photographic film image, which is about 24 mm by 36 mm, to the circular input of the intensifier.

It would also be desirable to provide an ultraviolet imager employing an electronic imaging device mounted to a single lens reflex camera and a viewing system providing optical coupling between the camera and the electronic imaging device, which can be readily assembled.

These and other additional objects of the invention can be achieved, and the problems encountered in achieving them can be solved by further aspects and embodiments of the invention which will now be described with reference to FIGS. 3–6.

Pursuant to the aspect of the invention illustrated by way of example in FIGS. 3–6, it has been discovered that good intensifier image flatness can be obtained by ensuring symmetry in the optical system between the camera plane of focus and the intensifier input. The desired symmetry is with respect to a center point, or transverse plane through the center point, on the optical axis between the camera plane of focus and the intensifier input.

Such symmetry can be obtained by employing a viewing system which comprises an ultravioletly reflective viewing mirror between the camera and the intensifier, to fold the optical path, preferably at a right angle, as described herein, and a pair of similar, preferably identical lenses in the optical path, one lens between the camera and the viewing mirror and the other lens between the intensifier and the viewing mirror. It is particularly preferred that the focal point of the one lens lie on the focal plane of the camera, in reflective mode, and the focal point of the other lens lie at the input to the intensifier. Thus, with lenses having identical optical characteristics, including the same focal lengths, which is preferred, the distance an object at the focal plane of the camera and one lens is the same as the distance between the other lens and the image at the intensifier input. With proper positioning, light between the lenses will be collimated. A great advantage of such collimation is that the focus of the viewing system is independent of the distance between the lenses. Although not essential, it is preferred that the viewing mirror be at the mid-point of the viewing system optics, on opposite sides of which the optical geometry is symmetrical.

Preferably, each lens comprises an assembly of two identical plano-convex lenses disposed with their convex surfaces opposed to one another or touching. It is particularly preferred that the lenses be Referring now to FIGS. 3–6, a modified ultraviolet imager system 100 comprises a camera body 102, modified for processing ultraviolet light, a camera lens (not shown) and an ultraviolet viewing system 103. Viewing system 103 comprises an electronic imaging device, such as a light intensifier 104, and a mirror holder 106 mounted on camera body 102 and coupled to light intensifier 104, as well as the optical elements mounted in mirror holder 106, as is described hereinbelow.

The electronic imaging device can be any suitable electronic device, or possibly an optical equivalent thereof, which can convert an invisible image to visible wavelengths and which preferably also amplifies the intensity of the image. Light intensifier 104 can be any suitable device meeting these requirements, for example, brand "DEP" model XX1440CK which has an 18 mm diameter input window, 36–40 line pairs/mm resolution and a phosphor output screen. The device employs a microchannel electron multiplier plate with proximity focus on input and output, is powered by two AA batteries and has a 43 mm external diameter and 38 mm length.

In the illustrated embodiment of the invention, mirror holder 106 provides physical support and positioning for light intensifier 104, being rigidly coupled thereto. In essence, the two units combine to provide an ultraviolet viewing and recording system for the ultraviolet-adapted camera comprising camera body 102 plus a suitable lens. Other means of mechanically coupling and supporting light intensifier 104 and mirror holder 106 to serve the optical purposes of the invention, will be apparent to those skilled in the art. In particular, it will be understood that different embodiments of light intensifiers from that shown may suggest alternative arrangements.

Camera body 102 comprises an ultraviolet-light-reflective movable mirror (not shown) which is similar to mirror 22, a film holder, shutter mechanism and so on. Imager system 100 is generally similar to image system 10 illustrated in FIG. 1, except for certain differences, notably the employment of a four-lens viewing system, which differences will be apparent from the following description. Any suitable lens, for example a normal (i.e 50 mm focal length lens for a 35 mm camera), telephoto, wide angle or zoom lens, selected according to the object or scene to be inspected, may be mounted to camera body 102 before use. Preferably the camera lens transmits ultraviolet light favorably, being formed, for example of a material such as fused silica, and preferably also an ultraviolet filter is provided on the camera lens, with a peak at or near the peak illumination wavelength, for example 254 nm, or other desired wavelength. Camera body 102, as shown, is a single lens reflex camera body designed to receive interchangeable lenses, but it will be understood that, with suitable modification, if necessary, other cameras, or camera bodies, can be employed.

Camera body 102 has a focusing window 105 which is a the location of a plane corresponding to the position of the focusing screen in a conventional, unmodified single lens reflex camera. By the time the ultraviolet imager of this embodiment of the invention reaches the user, the focusing screen has been removed, although it can and preferably is used by the manufacturer for pre-shipment set up of the imager at the factory. Thus focusing window 105 is the plane to which a target should be focused when the camera's mirror is in place, so that when the camera mirror is flipped by actuating the camera shutter, the target will be focused on the film. Focusing window 105 provides the object source for viewing system 103.

Intensifier 104 has an input window 107 the optical surface of which is the source plane of reference for the intensifier geometry. Thus an image focused to input window 107 can be expected to be in focus when displayed at the intensifier output.

Mirror holder 106 performs functions similar to those of second mirror holder 18 shown in FIG. 1, in that it mechanically and optically couples camera body 102 to light intensifier 104 (not shown).

Viewing system 103 functions to collect light reflected from the mirror of camera body 102 and. direct the received light to light intensifier 104. For this purpose, mirror holder 106 has the overall cross-sectional shape of a right-angled triangle defined by an input lens assembly, indicated generally at 108, an output lens assembly, indicated generally at 110 and disposed perpendicularly to input lens assembly 108, and a viewing mirror 112 disposed between the lens assemblies 108 and 110, at an angle of 45° to each. Lens assembly 108 is mounted in an inlet opening 114 in mirror holder 106 while lens assembly 110 is mounted in an outlet opening 116 in mirror holder 106. Lens assemblies 108–110 preferably converge incident light so that light rays between the lens assemblies are collimated, i.e. parallel to one another, and preferably also are essentially identical.

While in the preferred embodiment shown, mirror 112 reflects light at a right angle to the incident beam to provide a viewing path which is parallel to the incident light path to the camera's mirror, this geometry may be varied, if desired.

For example, intensifier 104 may have its optical axis elevated at an acute to the camera incident light path, and mirror holder 106 may be configured to provide an obtuse angle at mirror 112 between incident light from input lens assembly 108 and output lens assembly 110, enabling the user to hold imager 100 at waist height while looking down at the output of intensifier 104, a position that may be more comfortable or efficient for some users.

Input lens assembly 108 comprises a pair of inner and outer plano-convex lens elements 118–120, oriented with their convex faces opposed. Inner lens element 118 is retained against an abutment 122 in by a circlip 124 while outer lens element 120 is retained against a shoulder 126 by a circlip 128.

Outer lens assembly 110 also comprises a pair of inner and outer plano-convex lens elements 130–132, similar to lenses 118–120, which lens elements 130–132 are comparably mounted, in outlet opening 116, being held in place in convex-to-convex relationship, by a circlip 134 and spacers 136 and 138, against a shoulder 140 formed around outlet opening 116.

The depth or thickness of spacer 138 is selected to provide pre-set the focus of viewing system 103. It will be understood that circlip 134 has a high radial resilience (as does circlip 134) so that it can frictionally engage the wall of opening 116 at different axial positions of opening 116 according to the depth of spacer 138.

Figure 2:
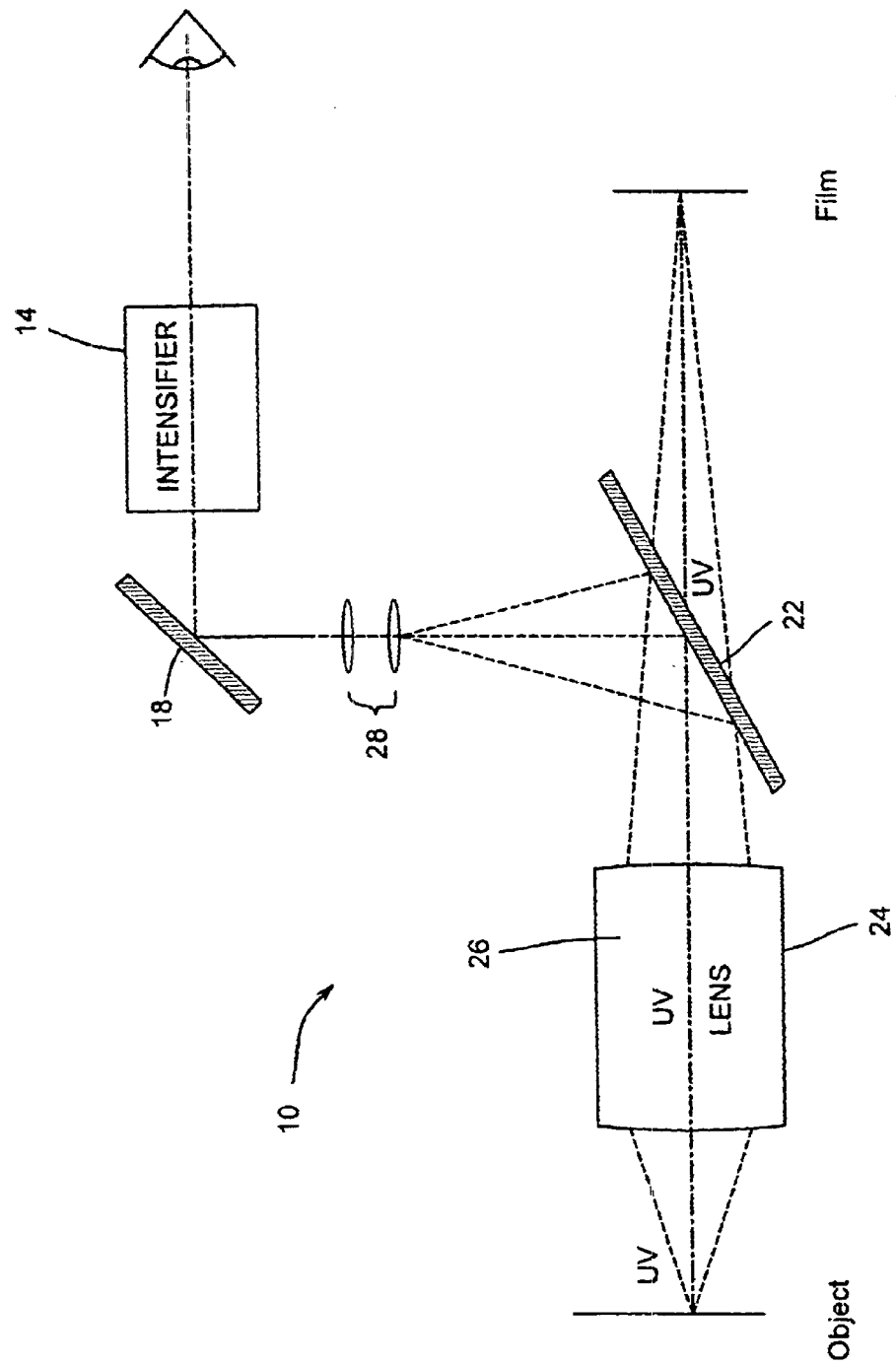
FIG. 2 is a schematic optical diagram of the ultraviolet-imager system shown in FIG. 1.

Inlet opening 114, outlet opening 116 and lens elements 118–120 and 130–132 can have any suitable cross-sectional shape, transversely to the paper in FIG. 2, depending upon the desired cross-sectional shape of the light path, and input requirements of intensifier 104, but for simplicity, are preferably circular.

The illustrated geometry is designed to provide both geometrical and optical symmetry on either side of the normal 121 to viewing mirror 112. Thus, to this end lens assemblies 108–110 and mirror 112 are juxtaposed in a right-isosceles triangular configuration, although other isosceles triangular configurations may be used, for example if it is desired to elevate the rearward end of intensifier 104.

For such symmetry it is strongly preferred that lens elements 118–120 and 130–132 have essentially similar, more preferably identical, optical characteristics. Such optical identity is particularly preferred to achieve the benefits of optical symmetry, pursuant to the invention. Thus, for example, in one preferred embodiment, each of these lenses can have a 100 mm focal length and be 25.4 mm (1 in) in diameter. It is preferred that lens elements 118–120 and 130–132 be fabricated of an ultraviolet-light transmissive material such as fused silica or quartz.

Furthermore, for symmetry and other optical objectives, it is particularly preferred that the focal point of lens assembly 108 coincide with focusing window 105 so that light from an image at focusing window 105 is collimated by lens assembly 108. Similarly, it is particularly preferred that the focal point of lens assembly 110 coincide with input window 107 so that lens assembly 110 focuses parallel light from lens assembly 108 to input window 107 of intensifier 104. There is thus a focal point-to-infinity-to-focal point configuration of the optical system which is lost if either lens assembly 108 or 110 is moved relative to the respective desired location of its focal point, namely focusing window 105 or input window 107. This relationship may be seen in FIGS. 5 and 6.

While it is preferred that viewing mirror 112 be planar, for simplicity and economy, it will be understood that other optical configurations within the scope of the invention may employ a spherically or parabolically concave mirror 112 or other suitable shape.

As will be understood by those skilled in the art, the focal length of lens elements 118–120 and 130–132 is selected according to the overall geometry and dimensions of imager 100 to enable a sharply focused target image to be projected to the input of imager system 100 with suitable adjustment of the camera lens, in the usual manner. It will also be understood that the optical characteristics of individual ones of lens elements 118–120 and 130–132 may be varied to achieve this result with different geometries and optical paths. Also, lens assemblies 108–110 could constitute a single lens element, equivalent to lens elements 118–120 and 130–132, for example a convex lens having a focal length of 50 mm, but for flatness of the intensifier output image, dual lens elements 118–120 are preferred.

Prior to shipment and once the system focus has been pre-set, as will be described hereinbelow, viewing mirror 112 is sealed into a recess 142 in mirror holder 106, with a suitable ultraviolet-resistant adhesive, for example with a black silicone adhesive or sealer, and is covered by a cover 144 which may display a logo, trademark or other product information. Mirror cover 144 can be secured by fasteners, such as a fastener 145, if desired.

Viewing mirror 112 is located in close proximity to lens assemblies 108–110 for compactness, control of the optical path and to reduce dispersion, and, as may be seen, is as close to lens assemblies 108–110 as structural considerations reasonably permit. Viewing mirror 112 should reflect ultraviolet light and is preferably coated to have peak or significant reflectance at the wavelength of illumination, for example 254 nm. A preferred viewing mirror 112 is a flat, circular, aluminum mirror, 40 mm in diameter and 3 mm thick, having a dielectric, ultraviolet-reflective coating. The coating can be designed to provide the desired peak reflectance at the illumination wavelength for light at the angle of incidence to the mirror, which in the preferred case shown is 45°. The camera mirror may be similar to viewing mirror 112. Suitable mirrors and lenses adapted for processing ultraviolet light are commercially available, for example, from Argyle Instruments, Inc. Princeton, N.J.

Shoulder 126 is a structural feature of a mounting tube 146 (see FIG. 3A), which is a further component of viewing system 103. Mounting tube 146 is closely fitted into an opening which is cut into the top of camera body 102 after removal of the prism from the camera. Mounting tube 146 is fixedly secured to camera body 102, in any desired manner, for example by a flange 147 secured by fasteners 149, possibly with adhesive as desired.

Mounting tube 146 is assembled with mirror holder 106 where it is received into a recess 148, and is preferably sealingly, secured to mirror holder 106, as an integral component thereof. In an alternative embodiment, mounting tube 146 is not sealed to mirror holder 106, so that viewing assembly 103 may be rotated relative to camera body 102, for example to permit ultraviolet photography in a restricted space. However, in this case, mounting tube 146 should be fixedly located in the vertical direction, as viewed in FIG. 3, to avoid focus problems, if necessary with suitable journaling.

Optimal focus of ultraviolet imager 100 requires a fixed spatial relationship between the optical components along the optical path. However, because of the reality of mechanical tolerances, the best of machining quality and other manufacturing procedures still results in some variation in this relationship, as between one production assembly and the next. Even a high quality tolerance of about 0.01 cm in each mechanical component must be summed across the number of components in the optical path and may lead to a significantly inferior focus, if no adjustments are made. Mirror holder 106 is uniquely designed to facilitate such adjustment and provide a fixed, optimal setting for shipment from the factory.

To preset the focus at the factory, the camera focusing screen is retained in its conventional position and the focus at the intensifier output is determined. If the focus is not optimal, a different depth, or thickness spacer 138 is employed, by selection from a set of spacers of having a range of depths corresponding with the range of adjustments required to provide optimal focus as between one product on the line and the next or subsequent products. By fine-tuning the distance between lens assemblies 108 and 110, the optical configuration of viewing system 103 can be adapted to the mechanical variability, without changing its own properties.

The focus is then rechecked and, if satisfactory, the focusing screen is removed from the camera (so that it will not impede the transmission of ultraviolet light), further testing is effected, as required, and the product is sealed and shipped. If the focus is not satisfactory, the process is repeated using another spacer 138. Because image light is collimated between lens assemblies 108–110, the relative positions of the lens assemblies to one another may be varied without loss of optical symmetry. The spacer 138 may be readily accessed and changed by removing mirror cover 144 and viewing mirror 112, exposing circlip 134, lens elements 130–132 and spacers 136–138 for easy removal and reassembly. Mirror 112 can be permanently sealed when focus has been set.

It will be understood that other mechanical means can be provided for focusing adjustment of lens assembly 110, for example a rotatable threaded sleeve which could be secured in a final position, to set the focus, by adhesive or other means. While it is preferred that the focus be factory set and not subsequently adjusted, in an alternative embodiment, the position of lens assembly 110 can be adjusted by manual rotation of an externally accessible ring driving a threaded sleeve to effect the adjustment.

It will be apparent that the components of mirror holder 106 can be readily assembled together and are securely held in place, once assembled. Once the focus is preset, as described hereinbelow, and mirror cover 144 has been sealed, mounting tube 146 has been sealed to camera body 102 and mirror holder 106, a sealed, focused, tamper-proof unit is provided which may be removably attached to intensifier 104, in the field by any suitable means, for example a knurled, threaded ring 147. It will be understood that unless or until sealed, the structure of the preferred embodiment shown in FIG. 3 permits separation of mounting tube 146 from mirror holder 106, for example for transport, without loss of either lens element 118 or 120 from the apparatus. This advantage is provided by the particular mounting arrangement used whereby lens element 118 is retained in mirror holder 106 by circlip 124, and lens element 120 is retained in mounting tube 146 by circlip 128.

Figure 5:
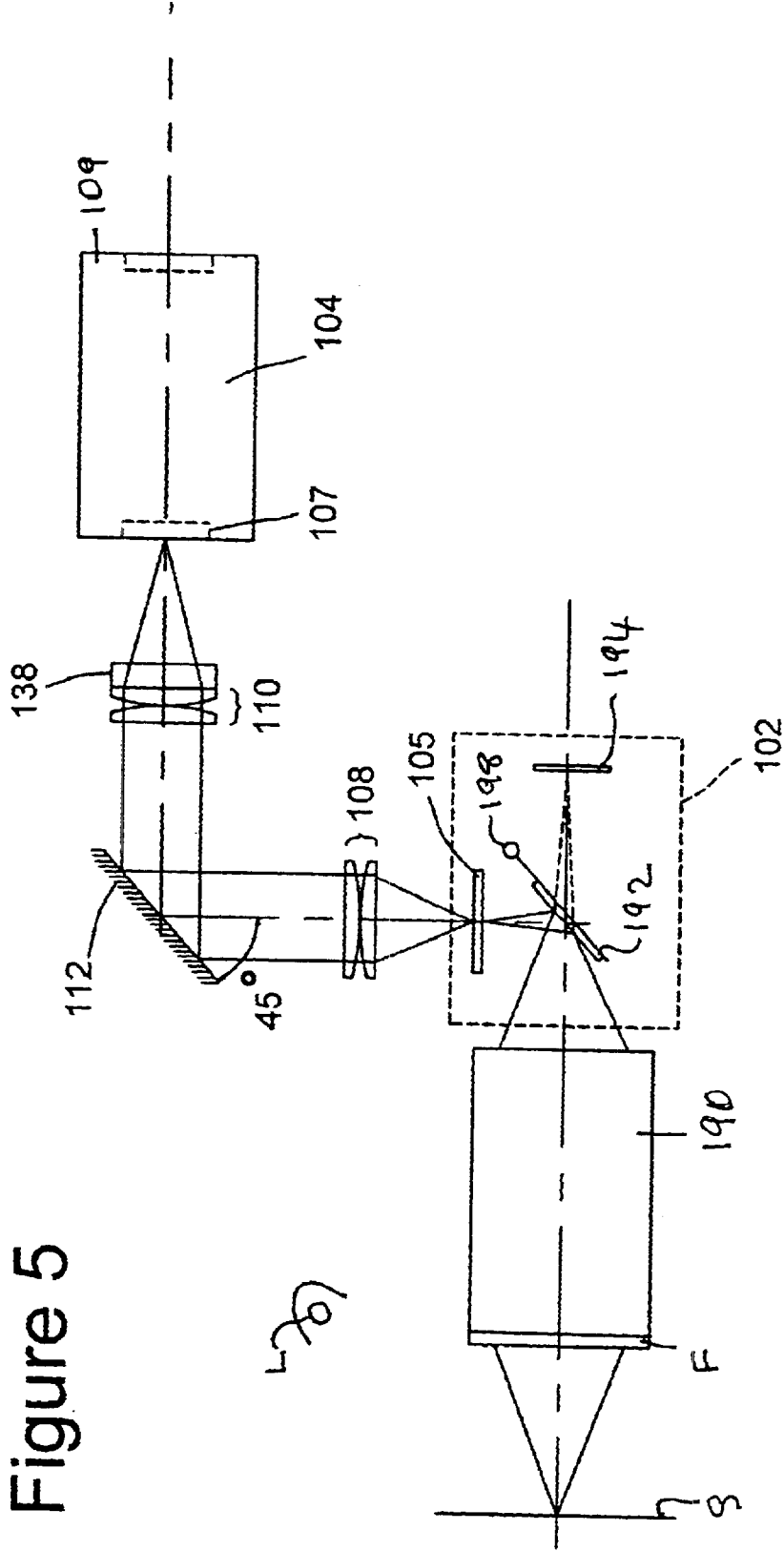
FIG. 5 is a schematic optical diagram of the ultraviolet imager shown in FIG. 3, with a camera lens included.

Referring now to FIG. 5, the operation of ultraviolet imager 100 can be understood. Ultraviolet light reflected from a target scene S to be photographed, which is illuminated by a suitable ultraviolet light L, having a peak, or significant output at or near a desired wavelength, for example 254 nm, is captured by a focusable photographic lens 190 which is ultraviolet-transmissive, preferably being formed of quartz. A filter F, which is preferably transmissive at or near 254 nm, filters out visible and other undesired wavelengths, to enhance image contrast at the illumination wavelength. Thus, the image captured by lens 190 is substantially entirely at invisible wavelengths, and depending upon the nature of target scene S, may differ substantially from the equivalent scene at visible wavelengths.

Lens 190 focuses the invisible image of scene S toward a retractable, or "flipping" camera mirror 192 which reflects the image to focusing window 105 which is positioned at the same optical distance from lens 190 as a film 194. The image may or may not be focused at focusing window 105, depending upon the adjustment of camera lens 190.

Lens assembly 108 collimates the image light from focusing window 105 into a parallel beam 196 which is reflected by viewing mirror 112 to lens assembly 138 which focuses parallel beam 196 to an image at the input window 107 of intensifier 104. Intensifier 104 converts the image at input window 107 to a visible light image at an intensifier output screen 109.

If ultraviolet imager 100 has been constructed, assembled and focused according to the preferred practice described hereinabove, the image received at output screen 109 will have a focus closely similar to the image at focusing window 105 and will comprise a significant or major portion of the area of the image at focusing window 105. If the image is out of focus at intensifier output screen 109, the focus may be adjusted in the usual manner by rotating camera lens 190 to provide an image at output screen 109 which has a large central image area that is sharply in focus. Operating the camera's shutter raises mirror 192 about pivot point 196, transmitting the focused image to expose film 194. Thus ultraviolet imager 100 enables the user to take a composed, focused ultraviolet photograph.

Figure 6A:
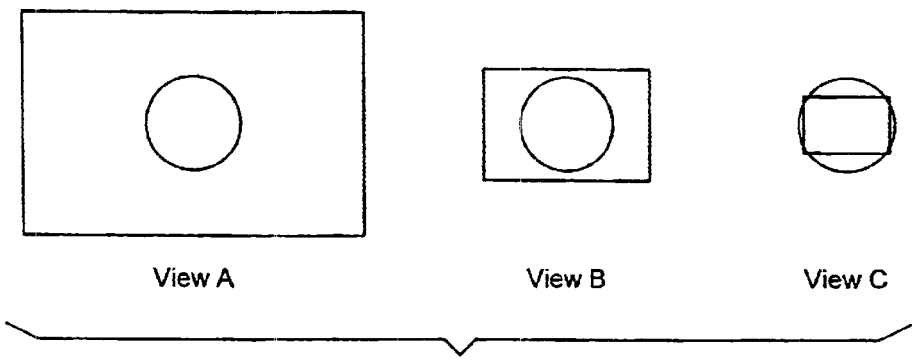
FIG. 6A is a schematic representation of the appearance of images of different sizes at the output of an intensifier.
Figure 6:
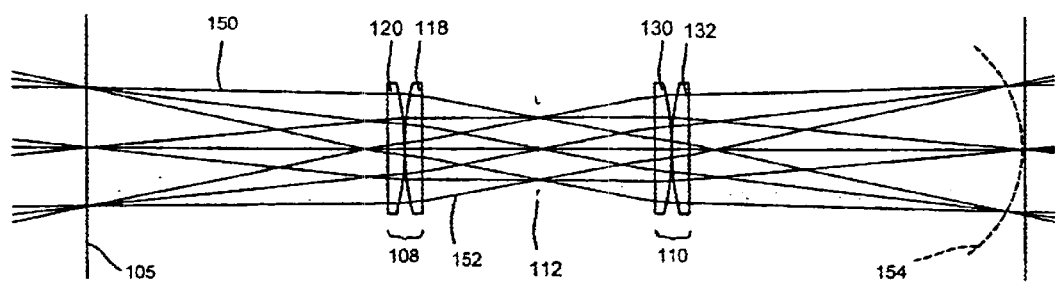
FIG. 6 is an unfolded optical diagram of the optical elements of a viewing system employed in the ultraviolet imager shown in FIG. 3.

Referring now to FIG. 6, here, the light path through viewer system 103 is shown schematically. and, for convenience, as being unfolded about mirror 112 where the light rays are reflected at a right angle to the incident path. The optical and geometrical symmetry from focusing window 105 to input screen 107 may be seen in that focusing window 105 and input screen 107 are equidistant from their respective lens assemblies 108, 110 which in their turn process light rays in a similar manner. Light rays 150 from the image at focusing window 105 diverge toward lens element 120 and are collimated into parallel rays 152 by lens elements 120–118. When there is symmetry, lens elements 130–132 focus the parallel rays 152 to points at input window 107, providing a focused image which is largely disposed in a plane and is therefore flattened so that a large central portion of the image area at output screen 107 is sharply in focus. Broken line 154 indicates the curved nature of the zone of focus when significant asymmetry is present, which results in only a small central portion of the image area at input screen 107 being in focus.

FIG. 6A illustrates the difficulty of designing optics to fit the scene captured on a rectangular film frame to the circular output of an intensifier such as intensifier 104. View A illustrates that with too much magnification in viewing system 103, only a small part of the scene is visualized and it is difficult to center and focus the image. View B represents a desirably configuration obtainable with the system illustrated in FIGS. 3–6, wherein the circular intensifier output displays a large portion of the scene facilitating target selection, composition and focusing. Optimally, the circular output displays substantially the whole height of the frame.

In View C substantially the whole of the scene on film is visualized, but a big part of the intensifier is not used. It is difficult to focus because it is hard to see the details.

The novel ultraviolet imager system illustrated in FIGS. 3–6 is particularly advantageous in providing excellent field flatness and excellent overall image quality at the intensifier output. Also the system provides a one-time, factory-set fine tuning and focus capability which can be sealed so that the user cannot access the focusing mechanism. No recalibration or refocusing is necessary or reasonably possible. A good, enlarged field of view is also provided. By employing purpose-specific ultravioletly-reflecting mirrors, customized for the imager system, excellent ultraviolet processing capability is provided.

Furthermore, both ultraviolet imager 10 and 100 enable live simultaneous viewing of an ultraviolet image, converted to visible light, and capture of the ultraviolet image on light sensitive film. At the same time, live focusing adjustments may be made, using the camera's focusing system, without requiring mechanical adjustments in the elements of the viewing path, after a one-time focusing of the viewing system, by the user in the case of imager 10, as shown in FIGS. 1–2 or at the factory, in the case of imager 100, as shown in FIGS. 3–6.

Figure 3:
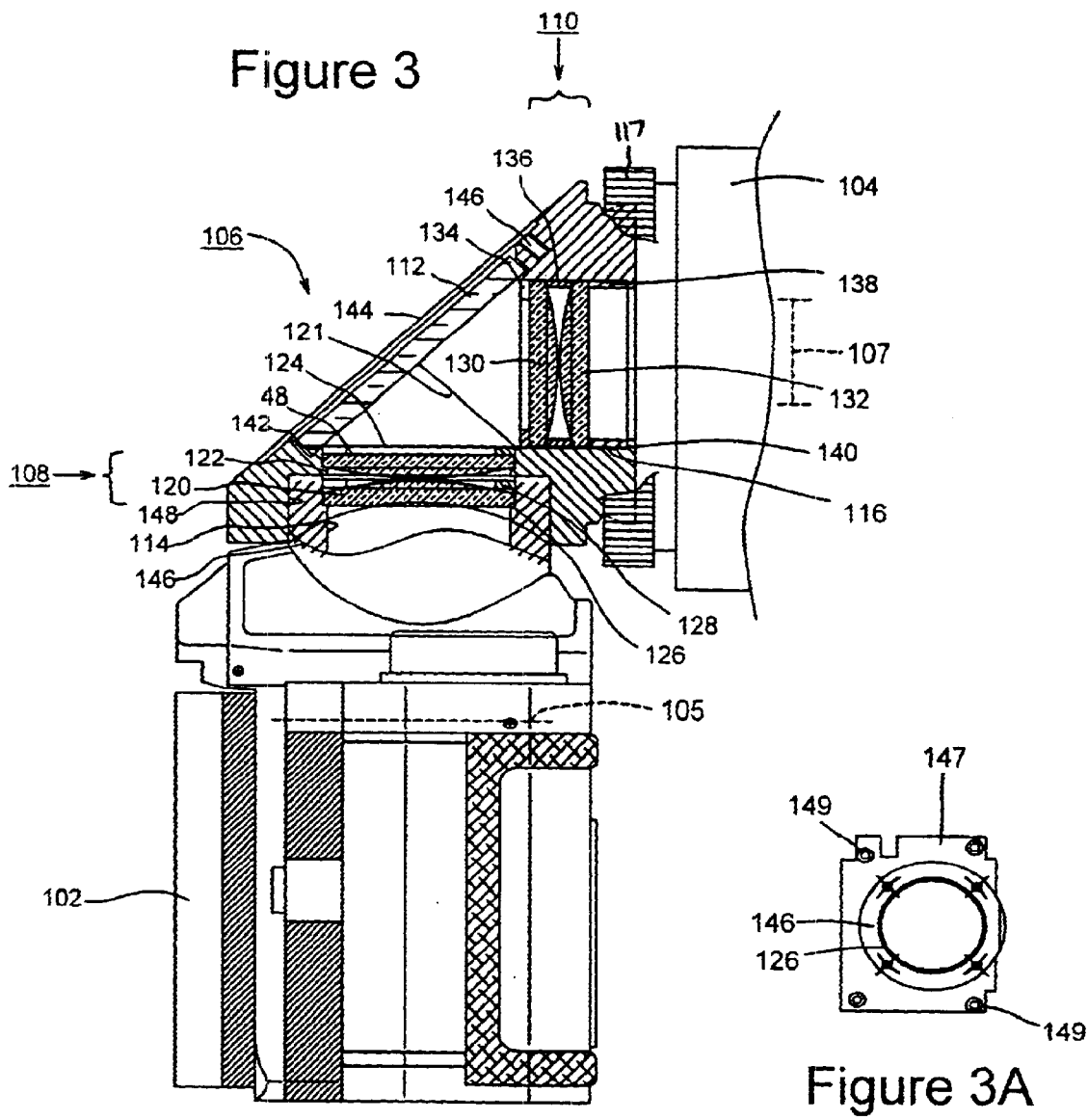
FIG. 3 is a side elevation view, partly in cross-section, of another embodiment of ultraviolet-imager according to the invention, employing a modified camera which is shown without a lens.
Figure 4:
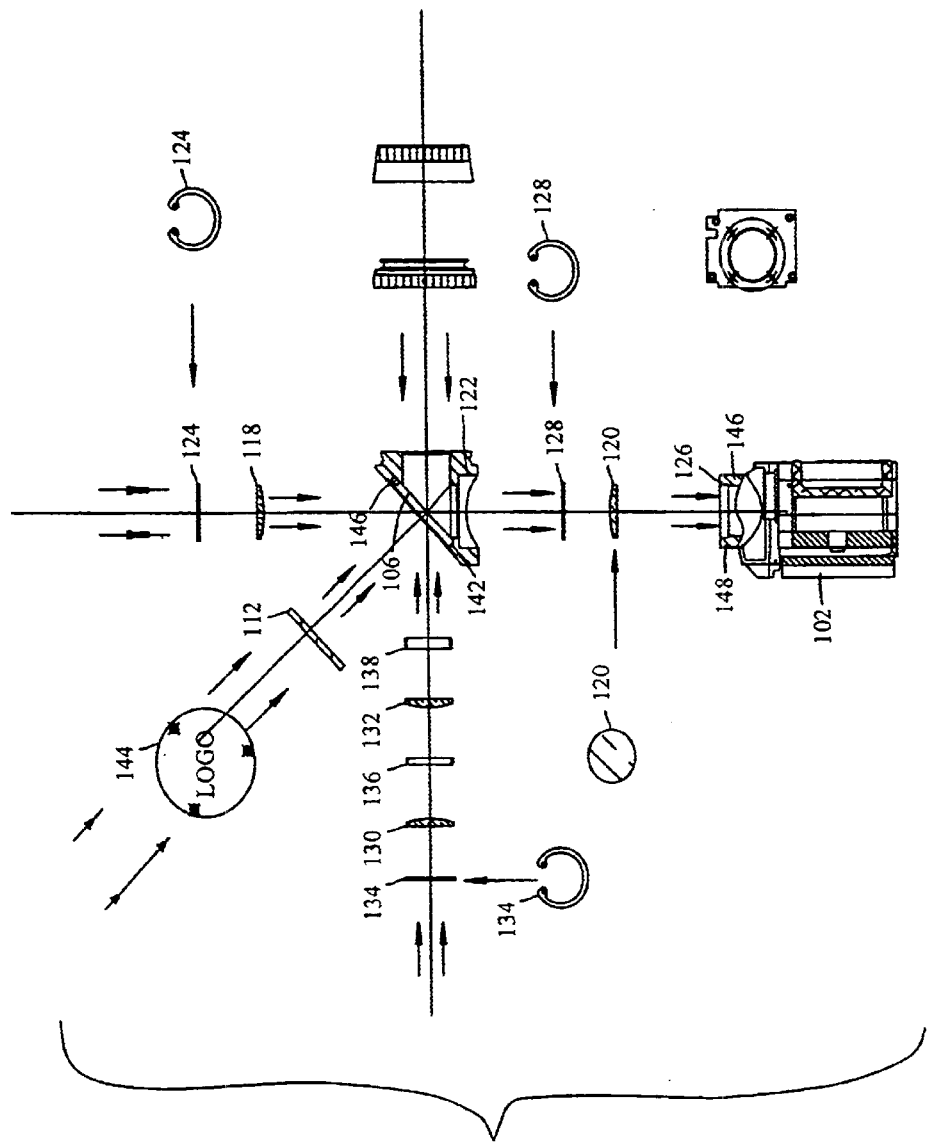
FIG. 4 is an exploded view of the components of the ultraviolet imager shown in FIG. 3.
Figure 7:
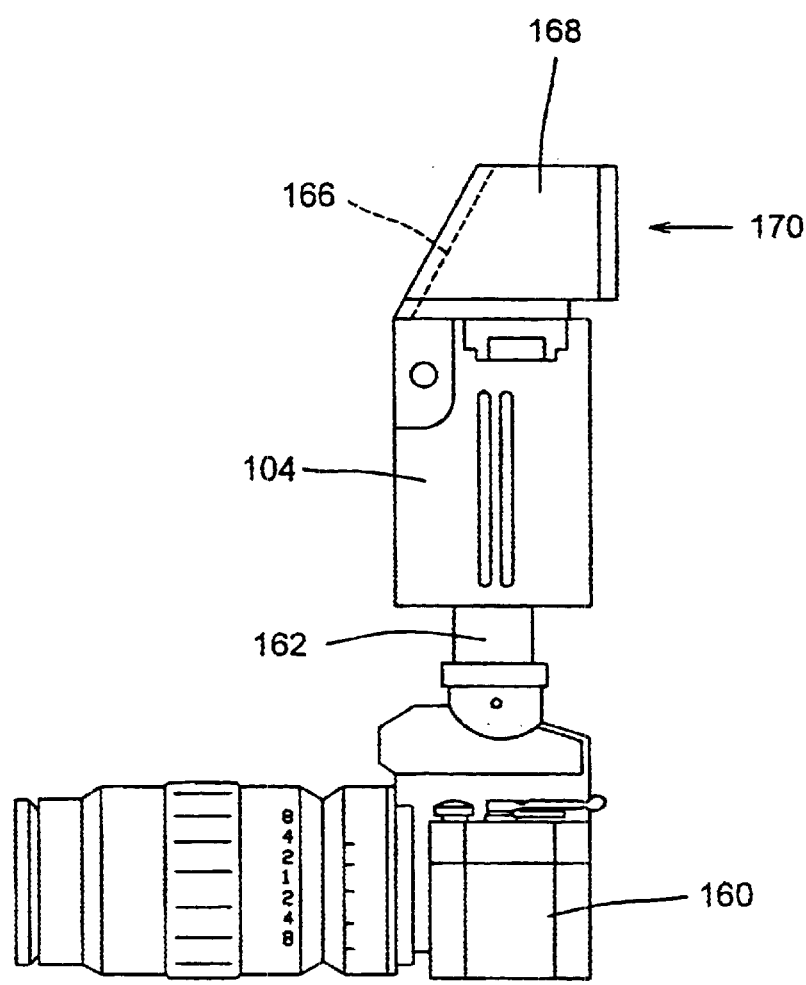
FIG. 7 is a side elevation view, of a further embodiment of ultraviolet-imager according to the invention.

The embodiment illustrated in FIG. 7, is similar to that shown in FIG. 3, except that the viewing mirror is moved from the ultraviolet domain to the visible domain, for economy and ease of construction. As shown, the optical axis of a modified light intensifier 164 is disposed vertically, at a right angle to the incident axis of a camera 160, which is an ultraviolet-light-modified camera, as described hereinabove. Light intensifier 164 is directly attached to, and supported by a mounting tube 162 which is similar to mounting tube 106, except that mounting tube 162 includes a pair of ultraviolet-light-transmissive projection lenses (not shown), like lens assembly 108, to project the image received from the camera mirror to the input of light intensifier 164, a simpler requirement in this configuration than with a right-angled optical path. Preferably the projection lens pair is arranged to provide a symmetrical optical path between camera 160 and light intensifier 164. In this embodiment, a right-angled mirror holder, like mirror holder 106 is not required because no mirror is employed to fold the light path between camera body 102 and light intensifier 104. Output 164 of light intensifier is provided with a planar visible light mirror 166, preferably at 45° to the vertical axis, although other angles may be used, is disposed to enable a user to view the horizontally disposed viewing screen of light intensifier 104. A shroud 168 excludes ambient light permitting the image to be clearly viewed in the direction of arrow 170. In use, a user can hold the camera closely to their body, unimpeded by a rearwardly projecting intensifier.

Figure 8:
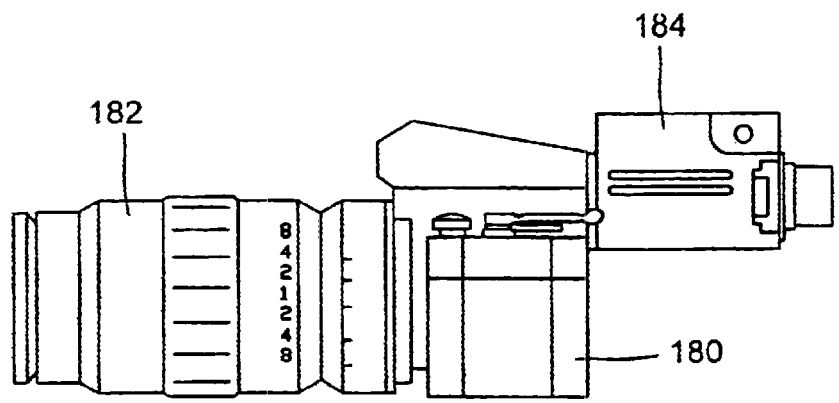
FIG. 8 is a side elevation view, of a still further embodiment of ultraviolet-imager according to the invention.

The embodiment illustrated in FIG. 8, employs an ultraviolet-light-modified single lens reflex camera 180 which, additionally to an ultraviolet-light-transmissive lens 182 and mirror (not shown), has an ultraviolet-light-transmissive prism (not shown). Here, a miniaturized light intensifier 184 is coupled directly to the viewfinder of camera 180, replacing the viewfinder lens.

It will also be understood that uses of the inventive ultraviolet imager and method are not limited to forensic applications, but include any field where it is desired to capture high quality ultraviolet light images, for example, in archeology, geology or paleontology for the examination of antiquities, rocks, fossils and the like, to reveal hidden structures or designs, in materials science for examination of material structures and defects, in microbiology, histology, medicine, meteorology, astronomy or any other field where ultraviolet illumination of subjects is employed. Thus, the invention includes novel methods of using an ultraviolet imager as described herein to process ultraviolet images, as described hereinabove, in any of the afore-mentioned fields and in other fields, as will be apparent to those skilled in the art.

Although the invention has been described with reference to the use of imager 10 or 100 for viewing and filming ultraviolet light images obtained by illuminating target scenes or objects with ultraviolet light it will be understood that the principles of the invention can also be applied to viewing and filming images illuminated, radiating or emitting, other invisible wavelengths. For example, an infrared imager can be provided by employing in the camera and viewing system lenses, mirrors and filters, if employed, that are adapted for processing infrared light, as known to those skilled in the art, and if necessary, by illuminating the target object or scene with infrared radiation. More probably, the object or scene of interest will emit suitable infrared radiation as heat, for example a human body, or an exhaust stream.

While viewing system 103 has been shown with light intensifier 104 coupled to the output of mirror holder 106, enabling direct human viewing of the image at the output of intensifier 104, it will be understood that other image processing devices can be optically coupled to mirror holder 106, as described with reference to FIG. 1, to provide digital image capture or viewing, which may optionally be employed for remote viewing. Such remote viewing capability may be used in conjunction with timing and/or motor-driven camera positioning means, and suitable remote shutter actuation devices for remote management of imager 100. It will be understood that the camera film image will usually have much higher definition, resolution, detail and overall quality than the viewing system image providing useful applications for such a remotely managed imager, especially for an infrared embodiment thereof, as described hereinabove, which applications will be apparent to those skilled in the art.

Although described for the preferred application of processing ultraviolet light, it will be understood that the invention can also provide imagers for processing radiation at other invisible wavelengths that are amenable to processing by optical elements, for example infrared light or radiant energy. To process infrared the various optical elements, notably mirrors and lenses are preferably optimized by selection of suitable infrared transmissive and reflective materials.

While illustrative embodiments of the invention have been described above, it is, of course, understood that various modifications will be apparent to those of ordinary skill in the art. Many such modifications are contemplated as being within the spirit and scope of the invention.

What is claimed is:

1. An ultraviolet light imager comprising:
   a) a camera having:
      i) a focusable camera lens to receive into the camera ultraviolet light images received from a target;
      ii) a film holder for film to capture images received from the camera lens, the spacing of the camera lens from the film being adjustable to focus an image on the film; and
      iii) a camera mirror to reflect light received from the camera lens to provide a reflected image for use in focusing the camera lens, wherein the reflected image is focused to a focusing window;

b) an electronic imaging device having an input to receive the reflected ultraviolet image from the camera mirror and provide a viewable output; and c) a viewing system to transmit the reflected image from the camera mirror to the electronic imaging device, the viewing system comprising;
   i) an optical path from the focusing window to the viewing system input, the optical path having an optical axis;
   ii) at least one optical element disposed on the optical axis;

wherein the viewing system is optically symmetrical on either side of a transverse plane through a mid-point of the optical axis.

2. An ultraviolet light imager according to claim 1 wherein the viewing system comprises a viewing mirror to fold the optical path and a pair of viewing lenses, one viewing lens being located between the viewing mirror and the camera and the other viewing lens being located between the viewing mirror and the electronic imaging device, wherein the viewing lenses have similar optical characteristics and light traveling between the viewing lenses is collimated.

3. An ultraviolet light imager according to claim 2 wherein the optical path is folded at a right angle at the mirror.

4. An ultraviolet light imager according to claim 2 wherein the viewing lenses have identical focal lengths, the focusing window is disposed at the focal point of the one viewing lens and the electronic imaging device input is disposed at the focal point of the other viewing lens.

5. An ultraviolet light imager according to claim 4 wherein the viewing lenses each comprise a pair of similar plano-convex lens elements, the elements of each lens pair being oriented with their convex surfaces opposed one to the other.

6. An ultraviolet light imager according to claim 4 wherein at least one of the lenses is positionable along the optical axis to focus the viewing system.

7. An ultraviolet light imager according to claim 6 having a factory preset focus effected by positioning the positionable lens with a spacer.

8. An ultraviolet light imager according to claim 6 having optical elements adapted for processing ultraviolet light wherein the electronic imaging device is a light intensifier.

9. An ultraviolet light imager according to claim 8 wherein all said lens or lens elements are formed of ultraviolet-light transmissive material and the camera mirror and viewing mirror have ultraviolet-light-reflective surfaces.

10. An ultraviolet light imager according to claim 2 wherein the camera lens and viewing lenses are formed of ultraviolet-light transmissive material and the camera mirror and viewing mirror have ultraviolet-light-reflective surfaces.

11. An ultraviolet light imager according to claim 10 wherein the viewing lenses have identical focal lengths, the focusing window is disposed at the focal point of the one viewing lens and the electronic imaging device input is disposed at the focal point of the other viewing lens; wherein the optical path is folded at a right angle at the mirror and wherein at least one of the lenses is positionable along the optical axis to focus the viewing system.

12. An ultraviolet light imager according to claim 11 having a factory preset focus effected by positioning the positionable lens with a spacer.

13. An ultraviolet light imager according to claim 11 wherein the viewing lenses each comprise a pair of similar plano-convex lens elements, the elements of each lens pair being oriented with their convex surfaces opposed one to the other.

14. An ultraviolet light imager according to claim 1 wherein the camera lens and mirror and the at least one optical element are adapted for processing ultraviolet light.

15. An ultraviolet light imager comprising:
a) a camera having:
   i) a focusable camera lens to receive into the camera ultraviolet light images received from a target;
   ii) a film holder for film to capture images received from the camera lens, the spacing of the camera lens from the film being adjustable to focus an image on the film; and
   iii) a camera mirror to reflect image light received from the camera lens to provide a reflected image for use in focusing the camera lens, wherein the reflected image is focused to a focusing window;

b) an electronic imaging device having an input to receive the reflected ultraviolet image from the camera mirror and provide a viewable output; and c) a viewing system to transmit the reflected image from the camera mirror to the electronic imaging device, the viewing system comprising;
   i) a viewing mirror disposed between the camera mirror and the electronic image device;
   ii) a first viewing lens disposed between the camera mirror and the viewing mirror to collect light from the camera mirror and transmit the collected light to the viewing mirror; and
   iii) a second viewing lens disposed between the viewing mirror and the electronic imaging device input to collect light from the camera mirror and transmit the collected light to the viewing mirror.

16. An ultraviolet light imager according to claim 15 wherein the camera lens and viewing lenses are formed of ultraviolet-light transmissive material and the camera mirror and viewing mirror have ultraviolet-light-reflective surfaces.

17. An ultraviolet light imager according to claim 16 wherein the viewing lenses have identical focal lengths, the focusing window is disposed at the focal point of the one viewing lens and the electronic imaging device input is disposed at the focal point of the other viewing lens; wherein the optical path is folded at a right angle at the mirror and wherein at least one of the lenses is positionable along the optical axis to focus the viewing system.

18. An ultraviolet light imager according to claim 17 having a factory preset focus effected by positioning the positionable lens with a spacer wherein the viewing lenses each comprise a pair of similar plano-convex lens elements, the elements of each lens pair being oriented with their convex surfaces opposed one to the other and wherein the electronic imaging device is a light intensifier.

19. An ultraviolet light imager according to claim 17 comprising a mirror holder housing the second mirror and mechanically coupled to the camera.

20. An ultraviolet light imager according to claim 15 having a factory preset focus effected by positioning the positionable lens with a spacer.

21. An ultraviolet light imager according to claim 15 wherein the viewing lenses each comprise a pair of similar plano-convex lens elements, the elements of each lens pair being oriented with their convex surfaces opposed one to the other.

22. An ultraviolet light imager comprising:
a) a camera having:
   i) a focusable camera lens to input ultraviolet light images to the camera;

ii) a film to capture images received from the camera lens, the spacing of the camera lens from the film being adjustable to focus an ultraviolet image on the film; and iii) a camera mirror having an ultraviolet-reflective surface to reflect a portion of the image light received from the camera lens to provide a reflected ultraviolet image for use in focusing the camera lens; and b) an image intensifier optically coupled to the camera to receive the reflected ultraviolet image from the camera mirror and provide a viewable output;

wherein the reflected ultraviolet image is focused to the viewable output of the intensifier wherein the camera lens is an ultraviolet-transmissive lens and wherein the camera includes an ultraviolet filter for the camera lens.

23. An ultraviolet light imager according to claim 22 comprising a second mirror having an ultraviolet-reflective surface, optionally a surface reflecting ultraviolet light at wavelengths from about 200 to about 360 nm, the second mirror being capable of reflecting to the intensifier images received from the camera mirror.

24. An invisible wavelength light imager comprising:
   a) a camera having:
      i) a focusable camera lens to input invisible wavelength light images to the camera;
      ii) a film to capture images received from the camera lens, the spacing of the camera lens from the film being adjustable to focus an invisible wavelength image on the film; and
      iii) a camera mirror having an invisible wavelength-reflective surface to reflect a portion of the image light received from the camera lens to provide a reflected invisible wavelength image for use in focusing the camera lens; and
   b) an image intensifier optically coupled to the camera to receive the reflected invisible wavelength image from the camera mirror and provide a viewable output;
wherein the reflected invisible wavelength image is focused to the viewable output of the intensifier.

25. An ultraviolet light imager for use with a camera having:
   i) a focusable camera lens to receive into the camera ultraviolet light images received from a target;
   ii) a film holder for film to capture images received from the camera lens, the spacing of the camera lens from the film being adjustable to focus an image on the film; and
   iii) a camera mirror to reflect light received from the camera lens to provide a reflected image for use in focusing the camera lens, wherein the reflected image is focused to a focusing window;
the light imager comprising:
   a) an electronic imaging device having an input to receive the reflected ultraviolet image from the camera mirror and provide a viewable output; and
   b) a viewing system to transmit the reflected image from the camera mirror to the electronic imaging device, the viewing system comprising;
      i) an optical path from the focusing window to the viewing system input, the optical path having an optical axis;
      ii) at least one optical element disposed on the optical axis;
wherein the viewing system is optically symmetrical on either side of a transverse plane through a mid-point of the optical axis.

26. An ultraviolet light imager for use with a camera having:
   i) a focusable camera lens to input ultraviolet light images to the camera;
   ii) a film to capture images received from the camera lens, the spacing of the camera lens from the film being adjustable to focus an ultraviolet image on the film; and
   iii) a camera mirror having an ultraviolet-reflective surface to reflect a portion of the image light received from the camera lens to provide a reflected ultraviolet image for use in focusing the camera lens;
the ultraviolet light imager comprising an image intensifier optically couplable to the camera to receive the reflected ultraviolet image from the camera mirror and provide a viewable output wherein the reflected ultraviolet image is focused to the viewable output of the intensifier.

27. An imager according to claim 26 wherein the camera lens is an ultraviolet-transmissive lens and wherein the camera includes an ultraviolet filter for the camera lens.

* * * * *